(12) United States Patent
Houston et al.

(10) Patent No.: US 11,362,590 B1
(45) Date of Patent: Jun. 14, 2022

(54) CURRENT LIMIT MODE DETECTION AND CONTROL IN A SWITCH MODE POWER SUPPLY

(71) Applicant: Renesas Electronics America Inc., Milpitas, CA (US)

(72) Inventors: Michael Jason Houston, Cary, NC (US); Allan Warrington, Kent (GB)

(73) Assignee: RENESAS ELECTRONICS AMERICA INC., Milpitas, CA (US)

( * ) Notice: Subject to any disclaimer, the term of this patent is extended or adjusted under 35 U.S.C. 154(b) by 0 days.

(21) Appl. No.: 16/785,198

(22) Filed: Feb. 7, 2020

Related U.S. Application Data

(60) Provisional application No. 62/803,385, filed on Feb. 8, 2019.

(51) Int. Cl.
  *H02M 3/158* (2006.01)
  *H02M 1/32* (2007.01)

(52) U.S. Cl.
  CPC ........... *H02M 3/1582* (2013.01); *H02M 1/32* (2013.01)

(58) Field of Classification Search
  CPC ............................... H02M 3/1582; H02M 1/32
  See application file for complete search history.

(56) References Cited

U.S. PATENT DOCUMENTS

| | | | |
|---|---|---|---|
| 8,710,810 B1 * | 4/2014 | McJimsey | H02M 3/157 323/272 |
| 9,413,242 B2 | 8/2016 | Arno | |
| 2008/0043391 A1 * | 2/2008 | Wong | H03F 1/52 361/59 |
| 2009/0115392 A1 | 5/2009 | Shimizu | |
| 2009/0153118 A1 | 6/2009 | Sato et al. | |
| 2011/0063760 A1 * | 3/2011 | Coley | H02M 1/32 323/284 |
| 2012/0008238 A1 * | 1/2012 | Thiele | H02P 7/06 361/18 |
| 2012/0038334 A1 | 2/2012 | Peng et al. | |
| 2012/0299568 A1 | 11/2012 | Kumagai et al. | |
| 2013/0200864 A1 | 8/2013 | Huang et al. | |
| 2014/0084883 A1 | 3/2014 | Tanabe | |
| 2014/0320104 A1 | 10/2014 | Guo | |
| 2015/0069957 A1 | 3/2015 | Chang et al. | |
| 2015/0194880 A1 | 7/2015 | Wibben | |
| 2015/0372613 A1 | 12/2015 | Houston et al. | |
| 2016/0246316 A1 | 8/2016 | Lim et al. | |
| 2016/0352128 A1 | 12/2016 | Houston et al. | |
| 2017/0077817 A1 | 3/2017 | Houston | |
| 2017/0194858 A1 | 7/2017 | Villot et al. | |
| 2019/0120905 A1 | 4/2019 | Wong et al. | |
| 2019/0222031 A1 * | 7/2019 | Carpenter, Jr | H02J 7/008 |
| 2019/0305666 A1 * | 10/2019 | Yang | H02M 3/1582 |
| 2019/0305688 A1 | 10/2019 | Seymour | |

(Continued)

*Primary Examiner* — Rafael O De Leon Domenech
(74) *Attorney, Agent, or Firm* — Foley & Lardner LLP

(57) ABSTRACT

One or more embodiments relate to a current limit mode control circuit for a buck-boost converter which can provide a stable switching of the converter by operating the converter in a current limit mode during an overcurrent condition, performing fewer state transitions while in the current limit mode, and/or by clamping (reducing to a lower value) the output of an error amplifier in the current limit mode for controlling a pulse width modulation (PWM) signal that drives the switching transistors.

17 Claims, 11 Drawing Sheets

(56) References Cited

U.S. PATENT DOCUMENTS

| | | |
|---|---|---|
| 2019/0356226 A1 | 11/2019 | Lin et al. |
| 2020/0006953 A1 | 1/2020 | Luo et al. |
| 2020/0099301 A1 | 3/2020 | Itou |
| 2020/0161977 A1* | 5/2020 | Yang .................... H02M 3/157 |
| 2020/0228013 A1* | 7/2020 | Chao .................... H02M 3/157 |
| 2020/0228018 A1 | 7/2020 | Wiktor et al. |

* cited by examiner

CURRENT LIMIT MODE DETECTION AND CONTROL IN A SWITCH MODE POWER SUPPLY

CROSS-REFERENCE TO RELATED PATENT APPLICATIONS

This application claims priority from U.S. Provisional Application No. 62/803,385, filed Feb. 8, 2019, the contents of which are incorporated herein by reference in their entirety.

TECHNICAL FIELD

The present embodiments relate generally to power management and power electronics.

BACKGROUND

Switch mode power converters are widely used in various power applications. Some such power converters, especially buck-boost converters, operate in various modes including various power stage configurations. These buck-boost power converters are required to automatically change modes, also referred to as states, between buck, boost, or buck-boost during operation while input/output voltage and loading conditions change. In any of the modes, peak current is limited to bound inductor current during an overload condition. Designing circuits for implementing peak current limiting without affecting stability of the converter can be challenging.

SUMMARY

One or more embodiments relate to a current limit mode control circuit for a buck-boost converter which can provide a stable switching of the converter by operating the converter in a current limit mode during an overcurrent condition, performing fewer state transitions while in the current limit mode, and/or by clamping (reducing to a lower value) the output of an error amplifier in the current limit mode for controlling a pulse width modulation (PWM) signal that drives the switching transistors.

According to certain aspects, embodiments can detect an overcurrent condition by comparing an inductor current to an overcurrent (OC) limit reference, generating an overcurrent (OC) signal if the inductor current exceeds the current limit reference, and use it to control the frequency of the PWM for a predefined time. The fewer state transitions may refer to implementing a two-state (buck and boost) switching instead of a three-state (buck, boost, and buck-boost) switching.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1:
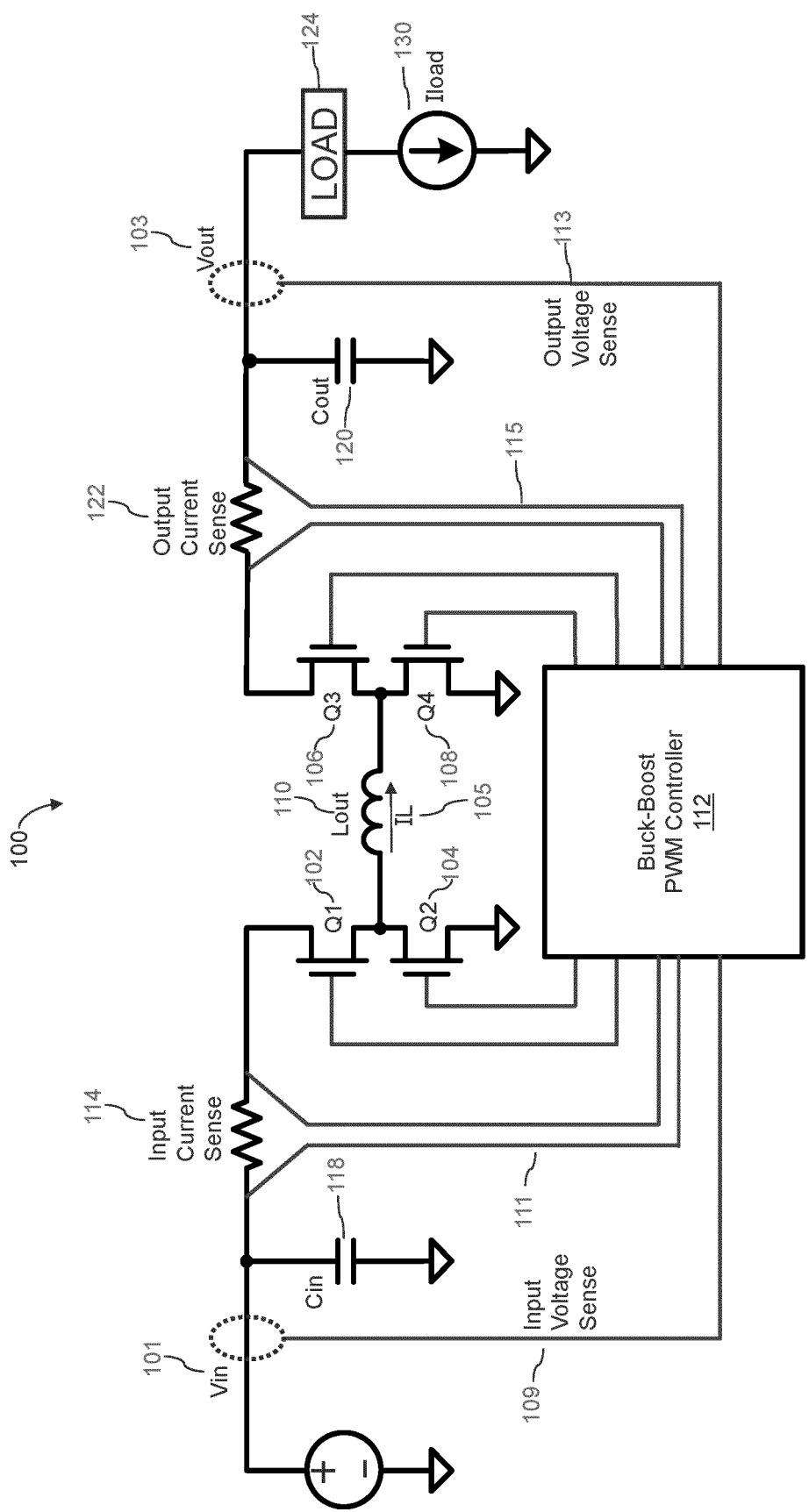
FIG. 1 is a diagram illustrating a standard configuration 100 of a buck-boost power converter.

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present Applicant recognizes that buck-boost regulators typically operate in different modes or states including buck, buck-boost, or boost. As it is well known in the art, in the buck mode the output voltage is typically equal to or lower than the input voltage and in the boost mode the output voltage is typically equal to or higher than the input voltage. The buck-boost converters are typically required to automatically change modes during operation while the input/output voltage and loading conditions are changing. In many applications, a buck-boost converter has to tightly regulate output voltage, output current, input voltage, or input current depending on operating conditions while operating in any of the three modes. Although seamless and stable mode transitions are important, those are difficult to achieve.

A buck-boost regulator typically includes a PWM controller that controls the switching transistors in all the three modes via one or more PWM signals. In an output voltage regulation mode, for example, this is usually implemented using an error amplifier which compares a feedback output voltage to a reference voltage, and generates an error signal which is used to modulate the PWM signal(s). The reference voltage can be either a constant voltage or a voltage ramp. The feedback output voltage can be received via an optocoupler, for example.

It may be further appreciated that the error amplifier is coupled to generate an error signal which can be based on the difference between a sensed output feedback voltage and a pre-set reference voltage. When a buck-boost power converter is operating stably in a particular mode, then the PWM controller may be configured to accommodate a maximum range of error from a desired output voltage as decided by the design. The controller is configured to constantly sense the output voltage and reduce the error between the output voltage and the desired output voltage by adjusting the PWM signal.

The PWM signal as such is used to control each switching cycle of the converter. For a robust behavior of the converter, among many other things, it is important to regulate the output current and control the switching of one or more transistors to limit the current through those, if the output current exceeds an overcurrent (OC) limit. Ideally, every switching cycle should have this current limiting feature. However, a cycle-by-cycle current limiting is difficult to achieve.

Many conventional power converter systems implement methods to limit a peak current in the inductor upon sensing an overcurrent condition and control the frequency of the PWM signal and the reference voltage ramp for the error amplifier in response to that by a common signal/s, which can lead to an asymmetric switching.

Embodiments of the present disclosure relate to a method and an apparatus for a current limit mode control circuit which is configured to detect an overcurrent condition and operate the converter in a current limit mode. In one example, in the current limit mode, the disclosed circuit is configured to limit the inductor current to a reference value and control the frequency of the PWM signal independent of the error voltage ramp for a predefined time. In one example, the predefined time can be equal to a PWM off time in a normal operation of the converter. In other examples, the off time can be decided by other design parameters. Since the PWM signal and the reference voltage, hereafter, ramp voltage, are controlled independently, the switching is more stable.

In one example, the circuit may detect an OC condition by comparing the inductor current to a reference current. Upon detecting an OC condition, the circuit may generate an OC signal and latch the OC signal. Furthermore, in order to control the frequency of the PWM signal, in one example, the circuit may generate an off pulse to disable the PWM signal for the predefined time. In other examples, the disclosed circuit may be modified to enable or disable the PWM signal as suitable per design considerations. The disclosed circuit can further implement a two-state switching, and clamp the output of an error amplifier for controlling the PWM signal while operating in the current limit mode.

Embodiments of the present disclosure relate to a method and an apparatus for a control circuit for a buck-boost converter which can detect an overcurrent situation and operate the converter in a current limit mode. In the current limit mode, the control circuit can limit the current through the converter by controlling the switching of one or more transistors when the output current exceeds an overcurrent limit. The disclosed circuit can further implement a two-stat switching, and clamp the output of an error amplifier for controlling a PWM signal while operating in a current limit mode.

FIG. 1 is a diagram illustrating a configuration of a buck-boost converter 100 including an input voltage supply 101, transistors Q1 102, Q2 104, Q3 106, and Q4 108, an inductor Lout 110, a buck-boost PWM controller 112, input capacitor Cin 118, output capacitor Cout 120, an input current sense resistor R1 114, an output current sense resistor R2 122, and a load 124.

The converter 100 is coupled to receive an input voltage Vin 103 from the voltage supply 101 and coupled to provide a regulated output voltage Vout and a regulated output current Iload 130 to a load. The switching of transistors Q1 102, Q2 104, Q3 106, and Q4 108 is controlled by the buck-boost PWM controller 112. An inductor current $I_L$ 105 may pass through the inductor Lout 110 in response to the switching of the transistors. The controller 112 is coupled to receive an input voltage sense signal 109, an input current sense signal 111, an output voltage sense signal 113, and an output current sense signal 115. As may be appreciated by those skilled in the art, the controller 112 may control the turning on and off of the transistors in various ways based on the above mentioned signals. For example, in a typical embodiment, there may be a feedback voltage Vfb generated from the output voltage sense signal 113 which may be compared to a reference voltage Vref (not shown in FIG. 1) and a result of the comparison may be used to control the turning on and off of the transistors to provide the regulated output Vout 107 and current Iload 130.

In general in the converter 100, there can be as many as four control loops including an output voltage control loop, and an output current control loop, an input voltage control loop, and an input current control loop. Any one of four loops can take control and provide regulation of the following signals output voltage, output current, input voltage, or input current.

Figure 2:
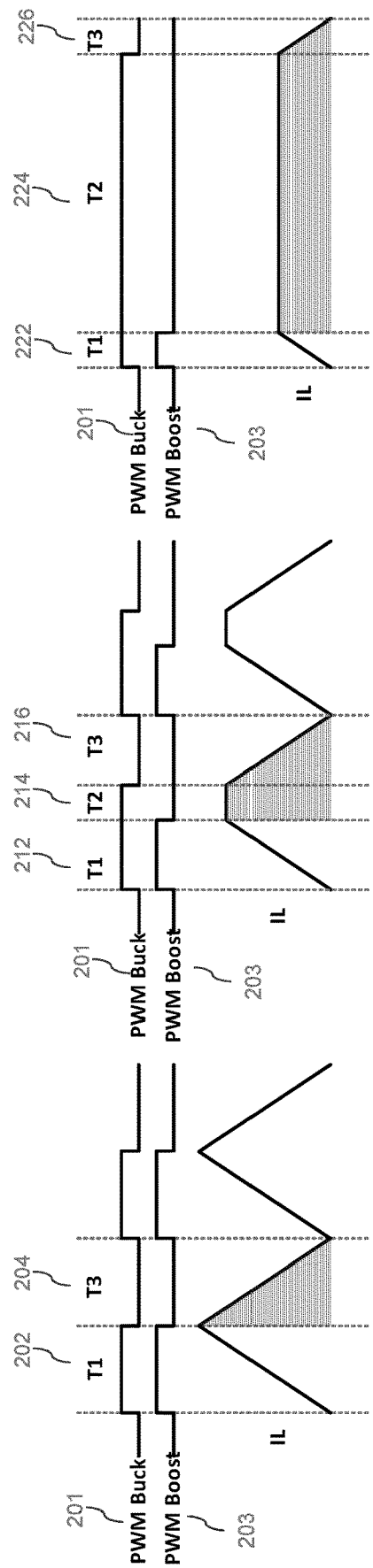
FIGS. 2A, 2B, and 2C are example diagrams illustrating typical PWM waveforms including a PWM buck 201 and a PWM boost 203 and the inductor current $I_L$ 105 of the buck-boost power converter of FIG. 1.

As set forth above, converter 100 can be configured to operate in either a buck mode, a boost mode, or a buck-boost mode of operation, for example depending on the relative values of the input voltage and the output voltage. FIGS. 2A, 2B, and 2C illustrate PWM waveforms during a buck-boost mode of operation, including a PWM buck signal 201 and a PWM boost signal 203 and inductor current $I_L$ 105 of the buck-boost power converter of FIG. 1. In the descriptions below, the PWM buck signal 201 being "on" refers to a condition when the controller causes the transistor Q1 to be turned on while transistor Q2 is turned off. Conversely, the PWM buck signal 201 being "off" refers to a condition when the controller causes the transistor Q1 to be turned off while transistor Q2 is turned on. Likewise, the PWM boost signal 203 being "on" refers to a condition when the controller causes the transistor Q4 to be turned on while transistor Q3 is turned off. Conversely, the PWM boost signal 203 being "off" refers to a condition when the controller causes the transistor Q4 to be turned off while transistor Q3 is turned on.

FIG. 2A, 2B, 2C illustrate different examples of how a controller can switch between switching states T1, T2, and T3 during a buck-boost mode of operation, and the resulting inductor current $I_L$ in each state. As can be seen from the figures, the state T1 is when both PWM boost and PWM buck are on. The state T2 is when PWM buck is on and PWM boost is off. The state T3 is when PWM buck is off and PWM boost is on.

In the example of FIG. 2A, the controller merely switches between the states T1 and T3 on each PWM cycle. FIG. 2B illustrates one example of switching between all three of the states T1, T2, and T3 during each PWM cycle. FIG. 2C illustrates another example of switching between all three of the states T1, T2, and T3 during each PWM cycle, albeit with a relatively longer duration of the T2 state as compared to the example of FIG. 2B.

Further, as illustrated in the example of FIG. 2A, during the state T1 202, the inductor current $I_L$ 105 increases and during the state T3 204 the inductor current $I_L$ 105 decreases. The load 124 is coupled to the inductor during the state T3 204. In the example of FIG. 2B, during the state T1 202, the inductor current $I_L$ 105 increases. The inductor current $I_L$ 105 may be substantially constant during the state T2 206 and decreases during the state T3 204. The load 124 is coupled to the inductor during the states T2 206 and T3 204. In the example of FIG. 2C, during the state T1 202, the inductor current $I_L$ 105 increases. The inductor current $I_L$ 105 may be substantially constant during the state T2 206 and decreases during the state T3 204. The load 124 is coupled to the inductor during the states T2 206 and T3 204.

As can be appreciated, a lower average current and lower ripple in the current results in a higher efficiency. Accordingly, in the example of FIG. 2A, switching frequency is well controlled but efficiency may be relatively low. In the example of FIG. 2B, frequency can be well controlled and efficiency can be improved. In the example of FIG. 2C, frequency may not be well controlled but efficiency is further improved.

As set forth above, a controller such as PWM controller 112 can monitor conditions such as input and output voltage values, and cause the converter to operate in either a buck, a boost or a buck-boost mode of operation based on the monitored conditions. For example, when the converter is operating in a buck-boost mode of operation (where the input and output voltages are relatively the same), but then the input voltage rises above a threshold value above the target output voltage, the controller 112 can perform a mode transition from the buck-boost mode to the buck mode.

Figure 3:
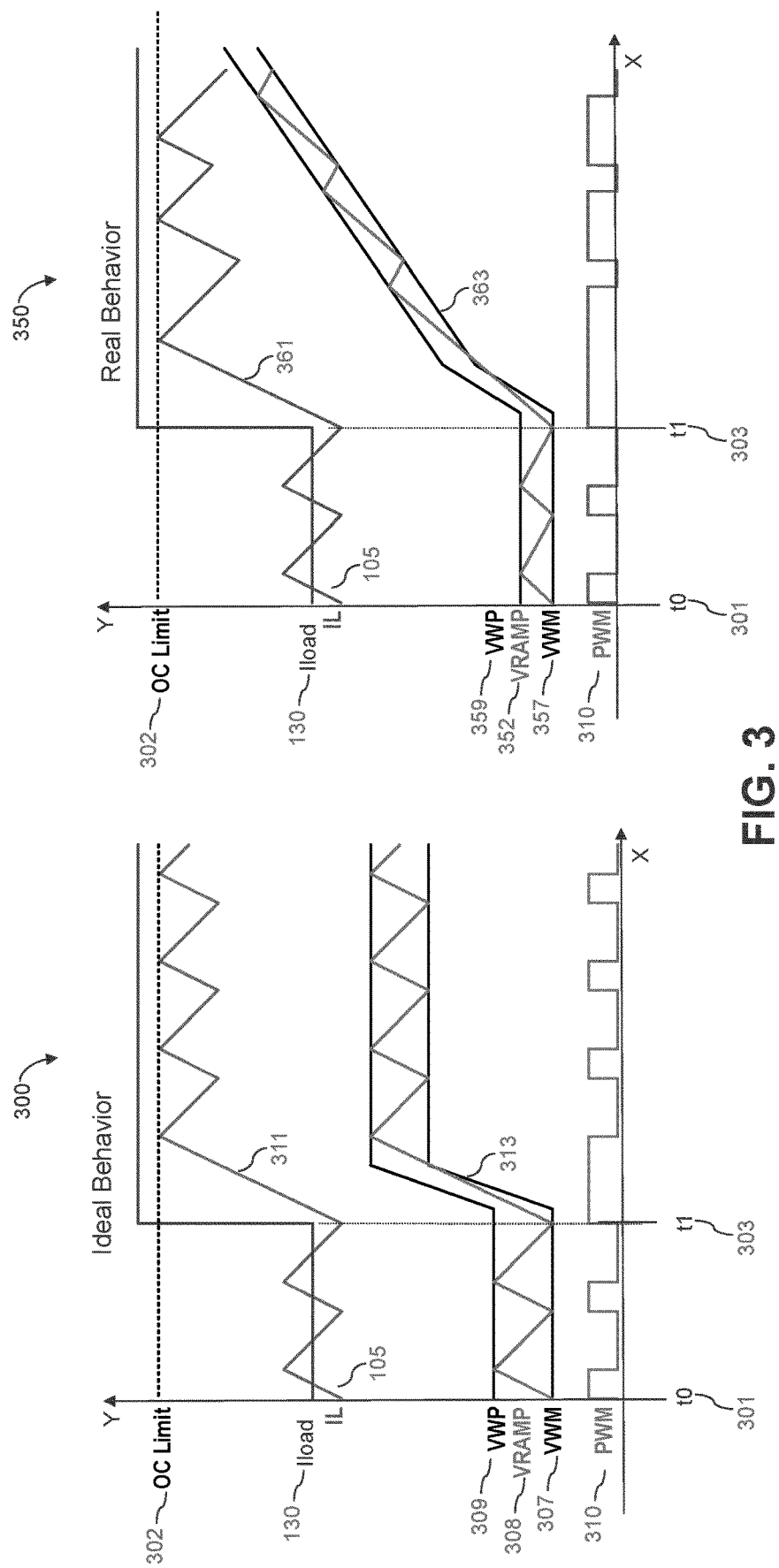
FIG. 3 is a diagram providing example waveforms of an ideal behavior and a real behavior of the buck-boost power converter of FIG. 1.

The mode transitions explained above relate to the converter's operation during regular load conditions. However, the behavior of the converter 100 can be during heavy load conditions or transients can also be an important design consideration. FIG. 3 is a diagram providing example waveforms explaining an ideal behavior 300 and a real behavior 350 of the buck-boost power converter 100 during a normal and a heavy load operation. The waveforms shown include an OC limit 302, a load current Iload 130, an inductor current $I_L$ 105, a ramp voltage Vramp, and a PWM signal 310. The x-axis illustrates time and the y-axis illustrates values of the various signals.

As can be seen, in the ideal behavior waveforms 300, from time t0 301 to time t1 303, the Iload 130 is at a normal level below the OC limit 302. During this time, the inductor current $I_L$ 105 may ramp up and down due to its normal behavior; and, the voltage Vramp 308 (e.g. generated based on the sensed output voltage) may also ramp up and down between levels VWP 309 and VWM 307, symmetrical to the $I_L$ ramp. As further shown, the Vramp signal thus controls the frequency and pulse width of the PWM signal. As can be seen, at time t1 303, the load suddenly becomes higher than the OC limit. At this time, the voltage Vramp 308 ramps up in a manner as shown by 313 and the inductor current $I_L$ 105 ramps up as in a manner shown by 311 up to the OC limit, in a manner symmetric with the Vramp 313.

In the real behavior waveforms 350 as well, from time t0 301 to time t1 303, the Iload 130 is at a normal level below the OC limit 302. During this time, similar to the ideal behavior, the voltage Vramp 308 may ramp up and down due to its normal behavior; and the inductor current $I_L$ 105 may also ramp up and down between levels VWP 359 and VWM 357. However, the $I_L$ ramp 306 is asymmetric with the Vramp 308. Further, when at time t1 303, the load current Iload 130 rises suddenly to a level higher that the OC limit 302. At this time, the Vramp 352 ramps up in a manner shown by 363 and the $I_L$ 105 ramps up in a manner shown by 361. However, as can be seen the $I_L$ ramp 306 is substantially asymmetrical with the Vramp 363.

Figure 4:
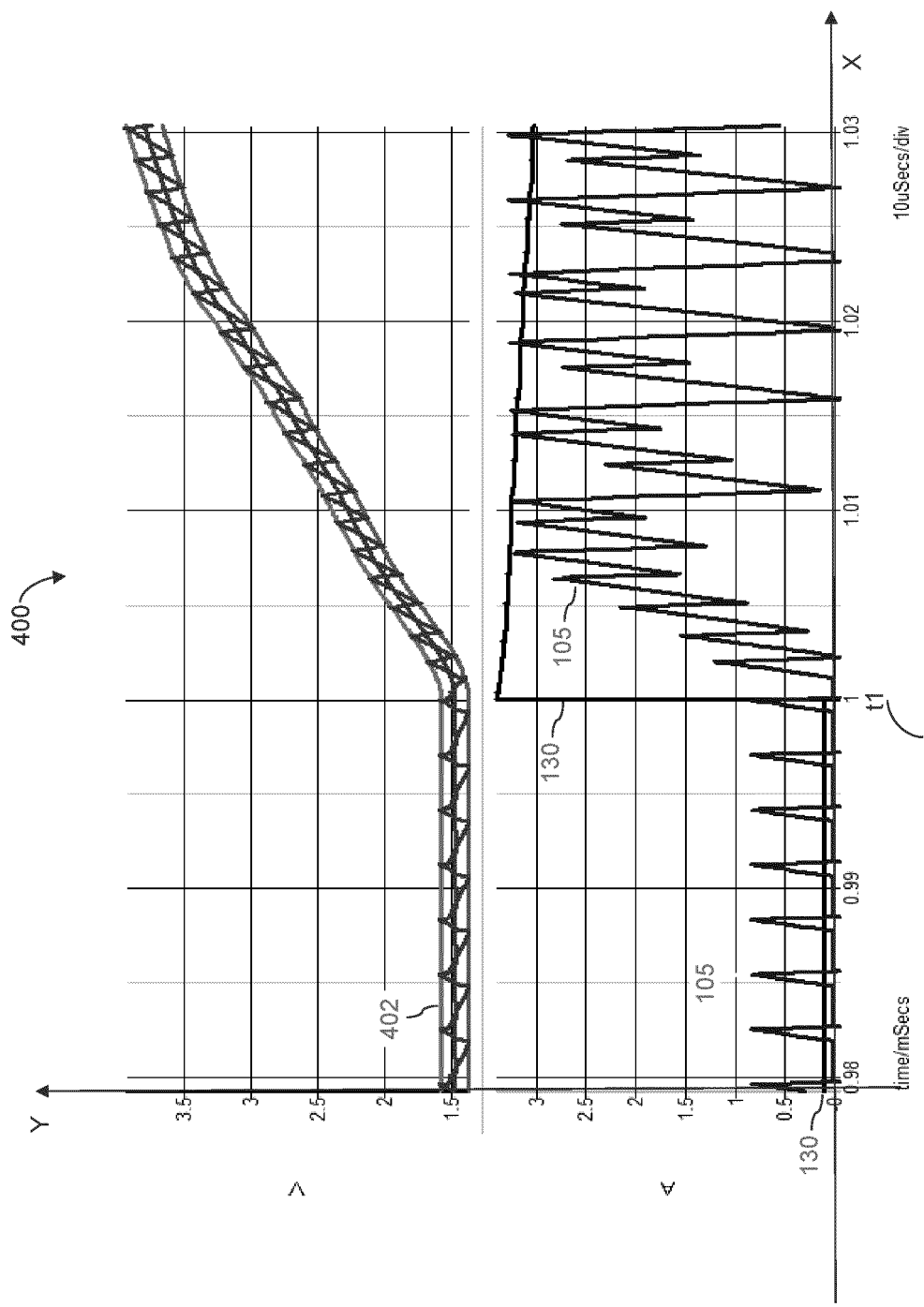
FIG. 4 is a diagram providing example waveforms associated with an existing type of buck-boost converter of FIG. 1 during a heavy load condition.

FIG. 4 is a diagram providing another example of waveforms associated with an existing type of buck-boost converter of FIG. 1 during a heavy load condition. Shown in FIG. 4 are Vramp 402, inductor current $I_L$ 105, and the load current Iload 130. From the time 0 to t1 403, the load is at a lower level. At time t1 403, the load current Iload 130 suddenly increases. After that, the inductor current $I_L$ 105 and the Vramp 402 also increase. As can be seen the $I_L$ 105 is asymmetric with the Vramp 402. This asymmetric ramping of inductor current during heavy load conditions, can lead to an unstable switching operation of the converter.

Among other things, the present Applicant has discovered that switching performance can become unstable especially during heavy load conditions. In particular, it has been discovered that if the output current exceeds the converter's specified current limit, then that can lead to a poor switching stability or an erratic switching of the transistors. Erratic switching can further lead to a loss of efficiency, a large ripple in the output voltage, and very large unwanted signal oscillations.

Meanwhile, the present Applicant has discovered that the above mentioned problems can be resolved by detecting an overcurrent (OC) condition by comparing the inductor current to a reference current and disable the PWM signal that controls the switching transistors for a predefined time to lower the inductor. Applicant has further discovered that a stable switching can be achieved by operating the converter in just two modes instead of three. The Applicant has additionally discovered that switching stability can be improved even further by clamping the output of the error amplifier to change the switching frequency of the PWM signal to control the switching of the transistors.

Figure 5:
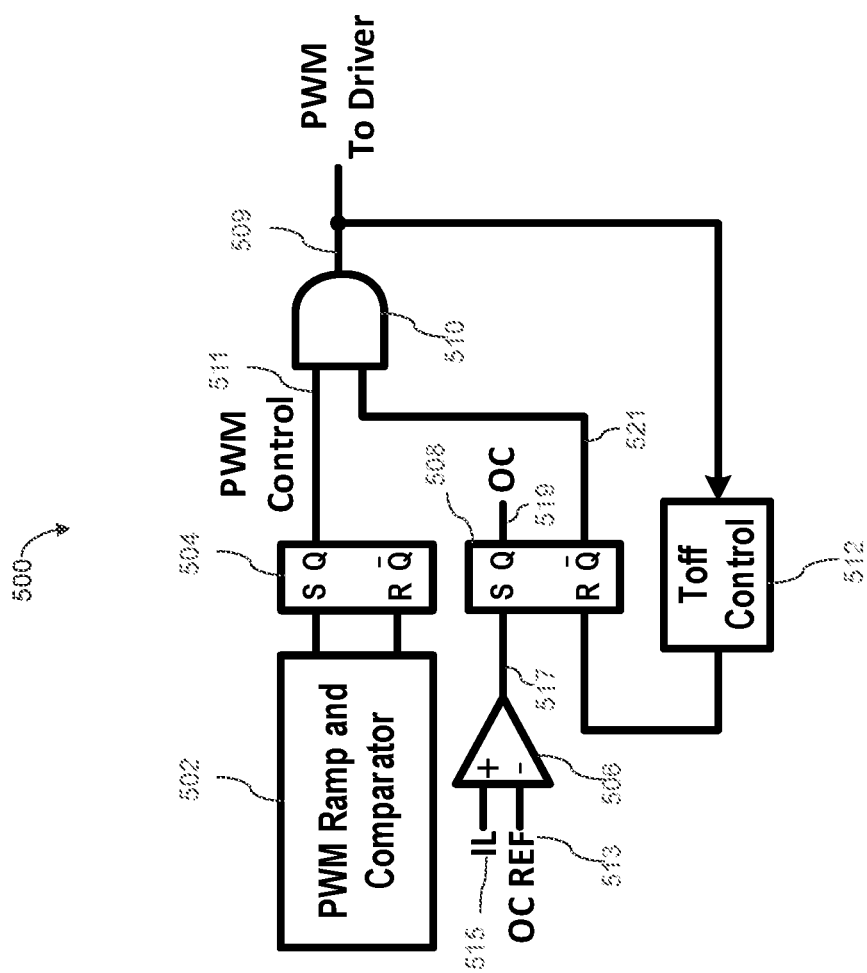
FIG. 5 is a diagram illustrating an example control circuit 500 that can be included in the converter of FIG. 1, according to an embodiment of the present disclosure.

FIG. 5 is a diagram illustrating an example control circuit 500 that can be included in the buck-boost PWM controller 112 in the converter 100 of FIG. 1, according to an embodiment of the present disclosure. It should be noted that controller 112 can include many other components, such as components for detecting and switching between modes, etc. However, such additional components are not shown for clarity of the present disclosure.

As will be explained, the control circuit 500 is configured to detect an overcurrent condition in response to the inductor current exceeding a reference current, and disable the PWM signal for controlling the transistors for a predefined time until the inductor current reduces to a value equal to or lower than the reference current. The reference current may be the maximum current that the inductor can pass for the converter's safe operation. In one example, the circuit 500 may achieve this by generating an OC signal when the inductor current exceeds the reference current, and latch the OC signal to generate an off pulse for disabling the PWM signal for a predefined time. The circuit 500 includes a PWM ramp and comparator unit 502, a first SR latch 504, a current comparator 506, a second SR latch 508, an AND gate 510, and an off time control unit Toff control 512. In one example, the PWM ramp and comparator unit 502 is configured to generate a ramp, which may be passed through the SR latch 504, the output of which generates a PWM control signal 511, which in turn is coupled to an input of the AND gate 510. The comparator 506 is coupled to receive an inductor current $I_L$ 515 at its non-inverting terminal and an overcurrent reference OC ref 513 at its inverting terminal. The output 517 of the comparator 506 is provided to the SR latch 508, the Q output which generates a signal OC 519. The opposite output, also referred to as an inverted output, Q' 521 is coupled to the other input of the AND gate 510. The output 509 of the AND gate 510 may further be provided to a PWM driver and is also provided to the Toff control unit 512. In general, a condition may be referred to as a safe current condition when the inductor current $I_L$ 105 is equal to or lower than the OC reference 513 and a condition may be referred to as an overcurrent condition when the inductor current $I_L$ 105 is greater than the OC reference 513.

As can be appreciated by those skilled in the art that in one example, as long as the inductor current $I_L$ 105 is equal to or lower than the OC reference 513, the output 517 of the comparator will be low. When inductor current $I_L$ 105 is greater than the OC reference 513, the output 517 of the comparator will be high. A low output of the comparator may generate a low or an inactive OC signal 519 via the SR latch 508 and a high output of the comparator may generate a high or an active OC signal 519 via the SR latch 508.

When the high output is latched by the SR latch 508 to generate a high or an active OC signal 519 via the Q output. At this time the Q' output 521 will be low disabling the AND gate 510. When the AND gate 510 is disabled, its output 509 which is the PWM to driver signal will be low, which may further turn off one or more the transistors Q1 120, Q2 104, Q3 106, and Q4 108. The output 509 of the AND gate may activate the Toff control unit 512 for a predefined time, also referred to as an off-time, after which it may provide a reset signal to the SR latch 508, which can enable the AND gate 510 again. In one example, the Toff control unit 512 may calculate the predefined time in response to the inductor current $I_L$ 105. Since the transistors are turned off during the off-time, the inductor current $I_L$ 105 will start to reduce. Once the $I_L$ 105 is reduced to a value equal to or lower that the OC ref 513, the output of the comparator 506 will become low again enabling the AND gate 510 to provide the PWM control signal 511 to the drivers.

As set forth above, by detecting an OC condition, generating the OC signal 519 in response to detecting the OC condition, latching the OC signal 519, and using it to disable the PWM control signal 511, the circuit shown in FIG. 5 can provide a better stability to the converter 100.

Figure 6:
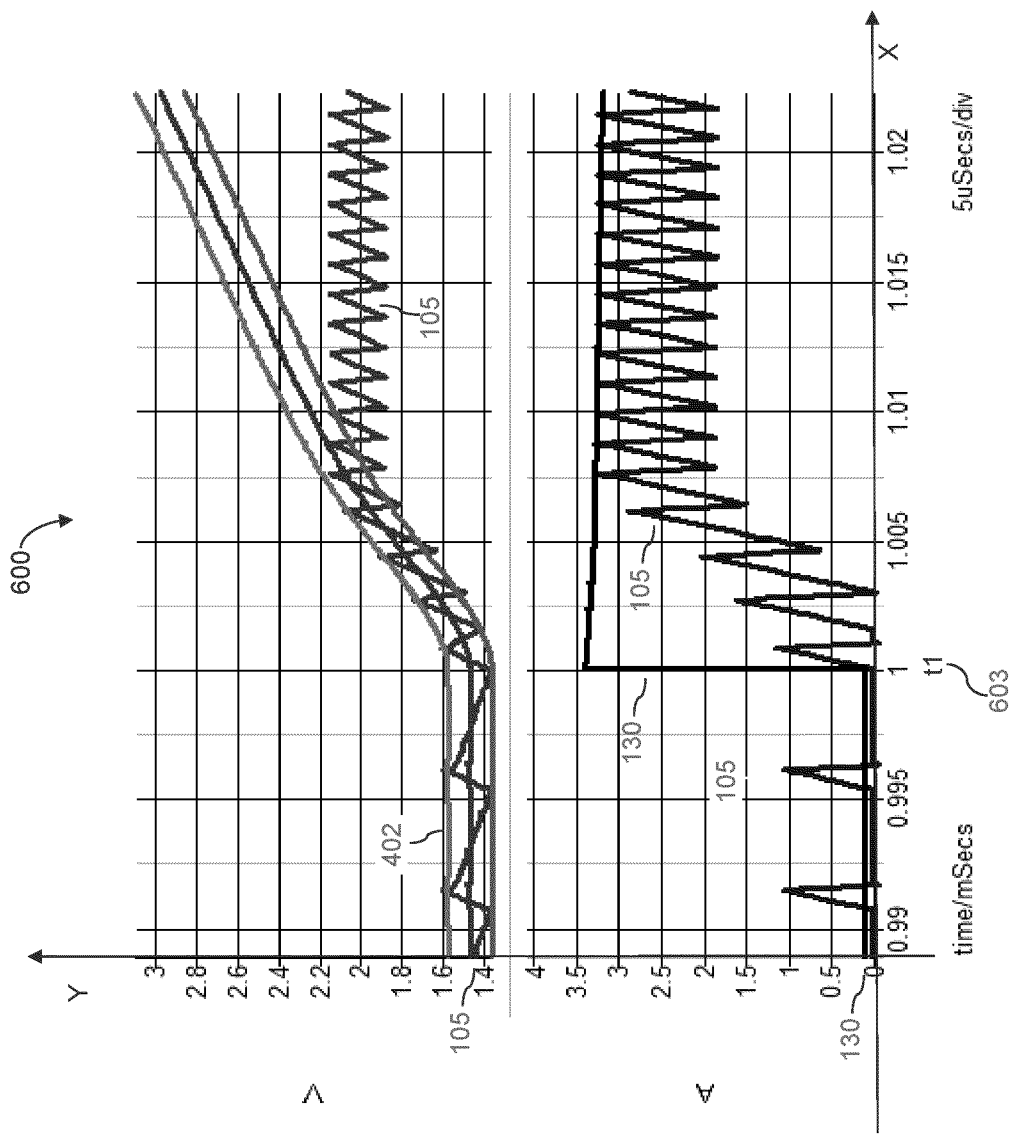
FIG. 6 is a diagram providing example waveforms associated with the buck-boost converter of FIG. 1 including the circuit of FIG. 5, according to an embodiment of the present disclosure.

FIG. 6 is a diagram providing example waveforms associated with the buck-boost converter of FIG. 1 including the circuit of FIG. 5, according to an embodiment of the present disclosure. The waveforms shown in FIG. 6 are similar to the shown in FIG. 4. As can be seen in comparison with FIG. 4, after the load current Iload 130 increases at time t1 603, the increase of Vramp 402 and the inductor current $I_L$ 105 are symmetric. This removes the instability in the switching substantially in each switching cycle of the converter 100.

Figure 7:
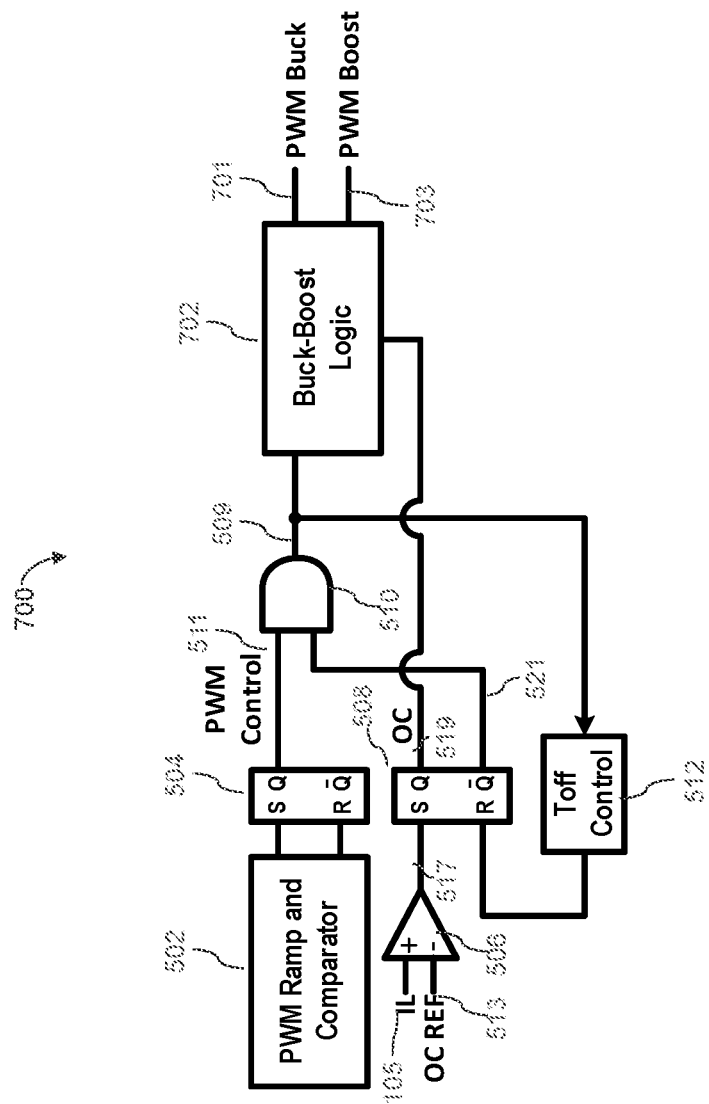
FIG. 7 is a diagram illustrating another example control circuit that can be included in the converter of FIG. 1, according to an embodiment of the present disclosure.

FIG. 7 is a diagram illustrating another embodiment 700 of the control circuit of FIG. 5 that can be included in the buck-boost PWM controller 112 of the converter 100 of FIG. 1, according to an embodiment of the present disclosure. The circuit 700 of FIG. 7 is similar to the circuit 500 of FIG. 5 but additionally includes a buck-boost logic unit 702 which is configured to generate a PWM buck signal 701 and a PWM boost signal 703. As can be seen, in one example, the buck-boost logic unit 702 is coupled to receive the OC signal 519 and is further configured to operate the converter in a buck mode via the PWM signal 701 or in a boost mode via the PWM boost signal 703 when the OC signal 519 is high i.e., when an OC condition is detected. In one example, this circuit arrangement allows the control signal to be separate from the ramp. Advantageously, the circuit of FIG. 7 can make the switching very stable with a switching frequency approximately the same as during a normal operation under normal load conditions.

Figure 8:
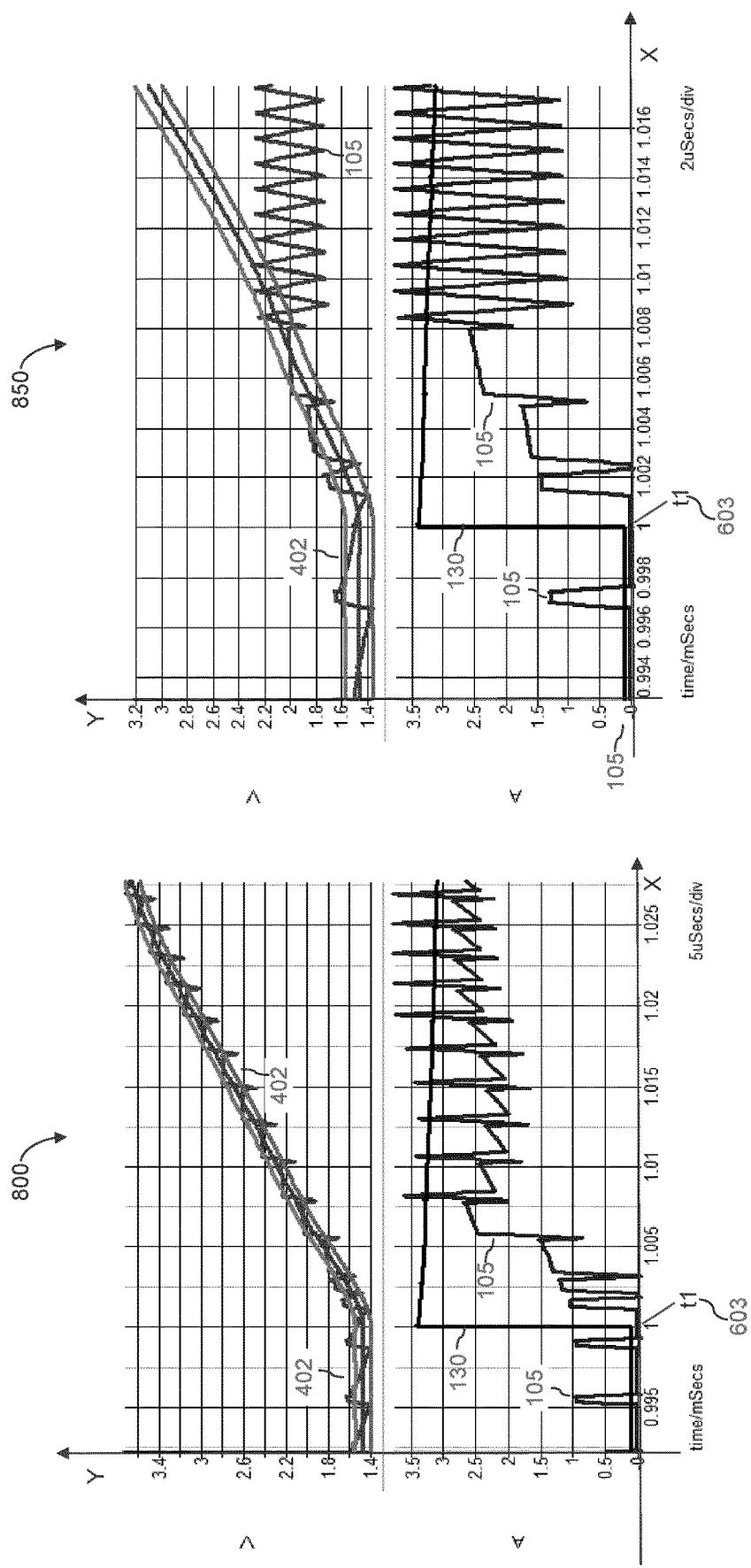
FIG. 8 is a diagram providing example waveforms associated with the buck-boost converter of FIG. 1 including the circuit of FIG. 7, according to an embodiment of the present disclosure.

FIG. 8 includes diagrams 800 and 850 providing example waveforms associated with the buck-boost converter of FIG. 1. The diagram 800 provides waveforms for the converter 100 with the circuit 600 when is operating in all the three modes buck, boost, and buck-boost. The diagram 850 provides example waveforms for the converter including the circuit 700, when it is configured to operate in the two modes buck and boost instead of the three. Included in both the diagrams 800 and 850 are the same signals and parameters as FIG. 4 and FIG. 6. As can be seen, in the diagram 800, even with the circuit 600, the $I_L$ ramp 105 and Vramp 402 are asymmetric and switching is unstable. This is because in a three-mode buck-boost converter, it is difficult to control the switching since OC can occur during first or second switching segment (T1 or T2). Therefore, even generating an off pulse by the OC signal 519 can limit lead to an erratic switching frequency. Average frequency can go up by a factor of two or more. As can be seen in the diagram 850, the $I_L$ 105 and Vramp 402 are symmetric and switching is even further improved, since the converter is operating in two modes buck and boost instead of three.

Figure 9:
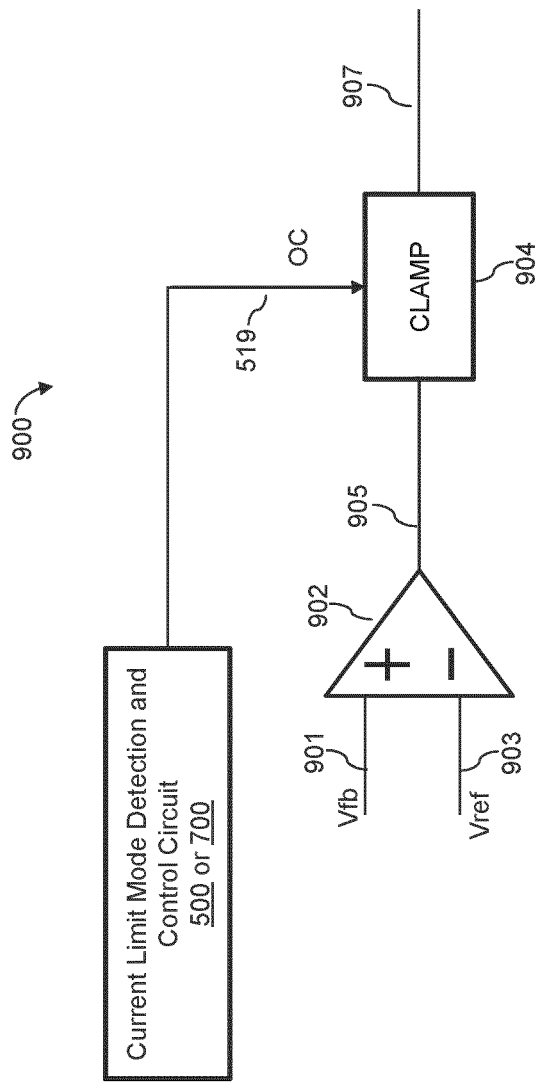
FIG. 9 is a diagram illustrating yet another example control circuit that can be included in the converter of FIG. 1, according to an embodiment of the present disclosure.

FIG. 9 is a diagram illustrating yet another example current limit mode control circuit 900 that can be included in the controller 112 of the converter 100 of FIG. 1, according to an embodiment of the present disclosure. As explained earlier, the controller 100 may include an error amplifier for comparing a feedback of the output voltage to reference voltage. In a conventional configuration, in an OC condition, the output voltage can drop as a result of which, the output of error amplifier can ramp far out of range of the ramp. This can cause a huge overshoot of the regulated output or regulated current after the OC recovery.

In one example, the circuit 900 is configured to significantly reduce overshoot in the regulated output voltage of the regulated output current. As shown the circuit 900 includes an error amplifier 902 and a clamp circuit 904. The error amplifier 902 coupled to receive a feedback voltage Vfb 901 via the output voltage sense signal 113 as shown in FIG. 1 at its non-inverting input; and a reference voltage Vref 903 at its inverting input. The output 905 of the error amplifier is provided to the clamp circuit 904. In one example, the output 907 of the clamp circuit 904 may be provided to the PWM ramp and comparator 502. The output 905 of the error amplifier 902 may be referred to as an unclamped error amplifier output and the output 907 may be referred to as a clamped error amplifier output. The clamp circuit 904 is also coupled to receive the OC signal 519 generated by the circuit 500 or 700. It may be noted that the circuit 900 is coupled to work with or as part of the circuits 500 or 700. All the three circuits can be integrated or discrete in any combination of relevant blocks and circuit elements included therein. In one example, the clamp circuit 904 can be a voltage clamp circuit implemented using any of the common methods in the art. Some common methods include circuits using passive of active elements such as resistors, capacitors, or diodes.

In one example, upon sensing the high OC signal 519, the output 905 of the error amplifier 902 may be clamped to a lower level. Those skilled in the art may be able to appreciate that clamping the error amplifier output while it is out of range of the ramp can significantly reduce overshoot. In other words, reducing the level of the error amplifier output, the frequency of the PWM signal may be reduced, which can reduce the overshoot in the regulated output or the regulated current. In other examples, the circuit 900 can be modified in any form to reduce the undershoots of the regulated output or regulated current.

Figure 10:
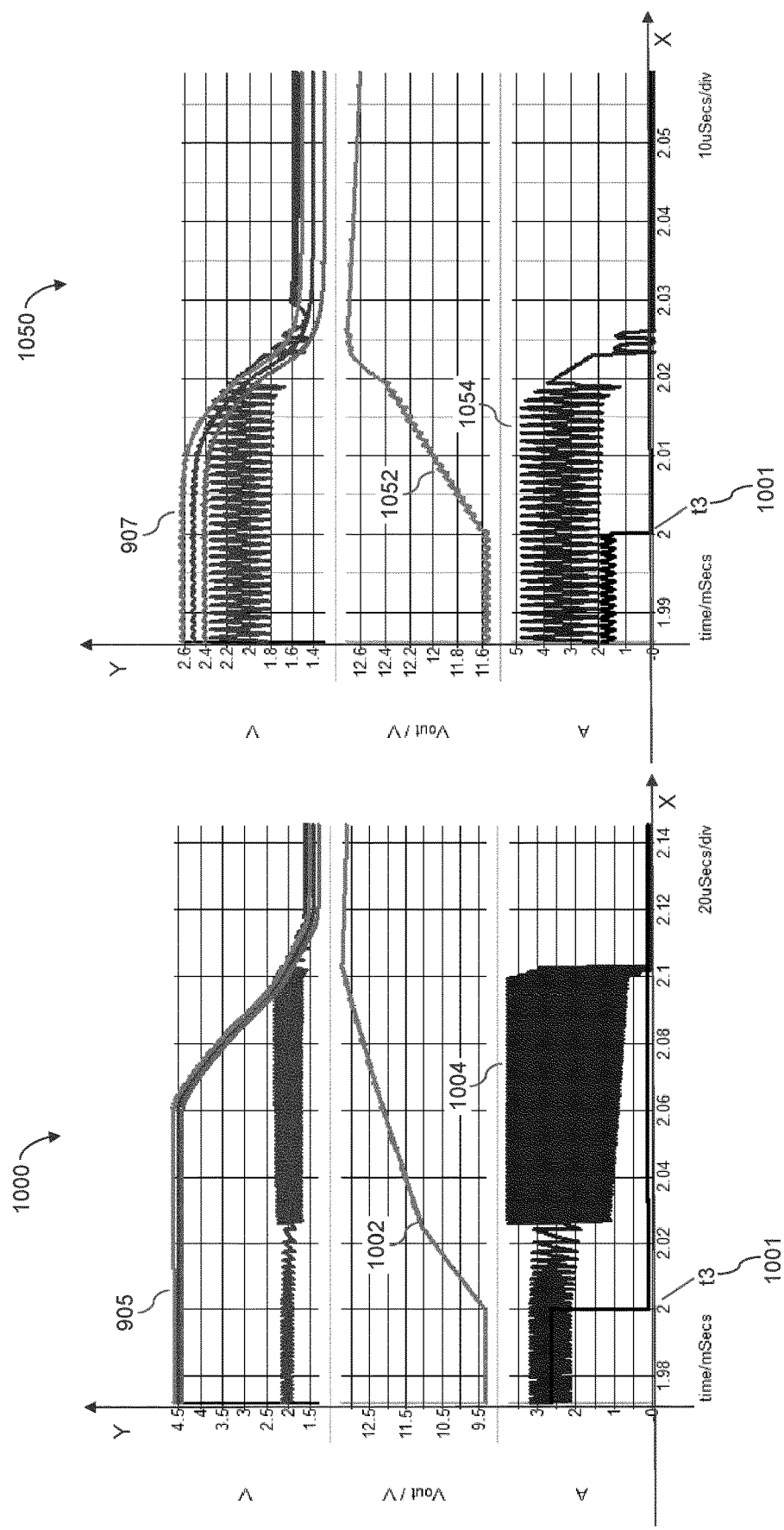
FIG. 10 is a diagram providing example waveforms associated with the buck-boost converter of FIG. 1 including the circuit of FIG. 7, according to an embodiment of the present disclosure.

FIG. 10 includes diagrams 1000 and 1050 providing example waveforms associated with the buck-boost converter of FIG. 1. The diagram 1000 provides example waveforms without the circuit 900; the diagram 1050 provides example waveforms including the circuit 900 of FIG. 9. In the waveforms of diagram 1000 illustrate an OC recovery at time t3 1001 caused by the unclamped error amplifier output 905 of the error amplifier 902. At this time a huge overshoot is seen on the regulated output voltage Vout as indicated by 1002. Also seen is a huge overshoot of current as indicated by 1004.

The waveforms of diagram 1050 also illustrate an OC recovery at time t3 1001 caused by the clamped error amplifier output 907. However, contrary to as shown in 1000, the overshoot of the regulated output voltage is reduced as indicated by 1052 and the overshoot of the regulated output current is reduced as indicated by 1054.

Figure 11:
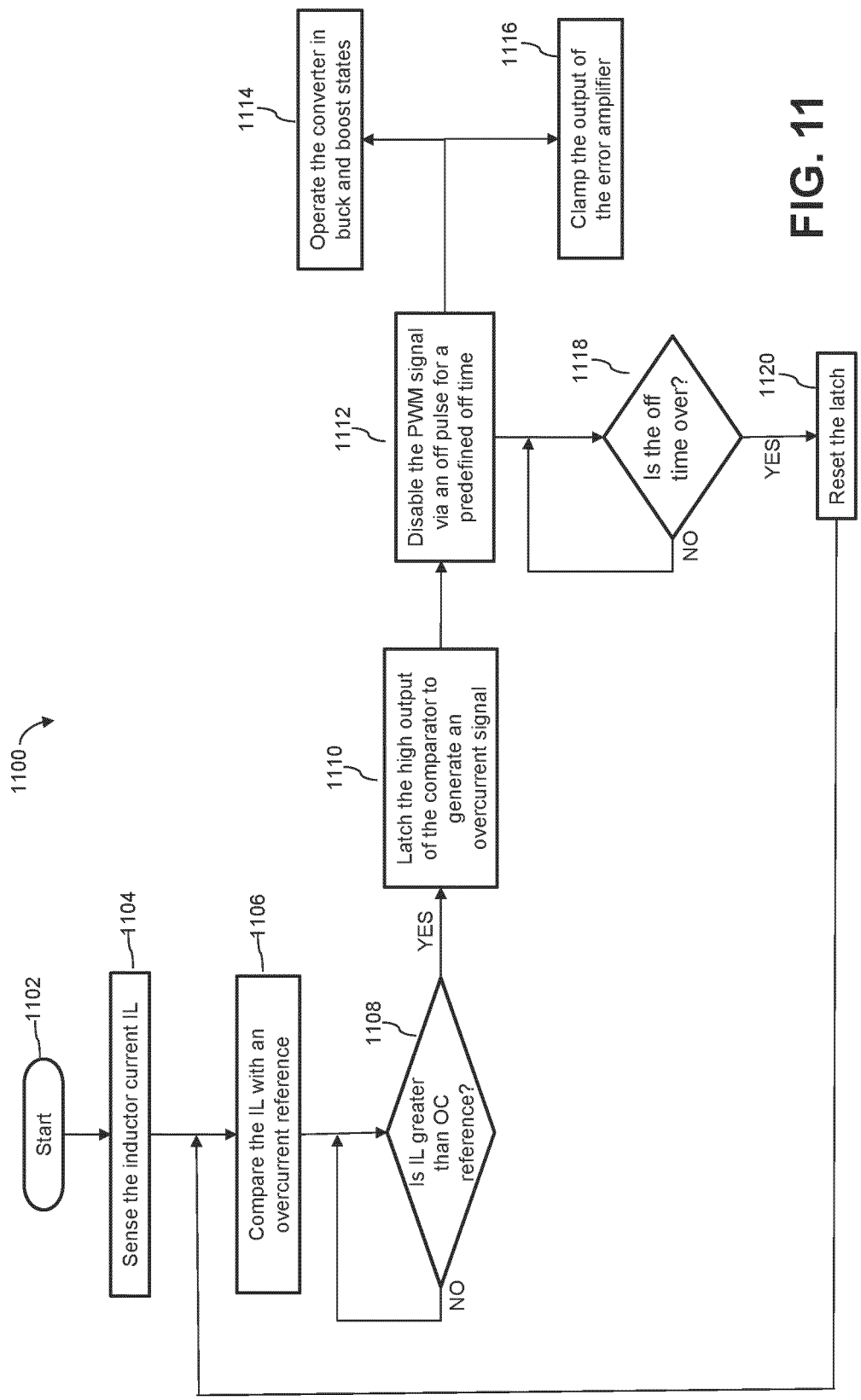
FIG. 11 illustrates an example flow diagram 1100 of implementation of the current limit mode control circuit of FIG. 5, FIG. 7, and FIG. 9 to be included in the converter 100 of FIG. 1, according to an embodiment of the present disclosure.

FIG. 11 illustrates an example flow diagram 1100 of implementation of the current limit mode control circuit of FIG. 5, FIG. 6, and FIG. 7 to be included in the converter 100 of FIG. 1, according to an embodiment of the present disclosure.

The flow diagram 1100 illustrates an example method for the buck-boost PWM controller 112 to compare the inductor current to an OC reference to generate an OC signal, and further enable or disable the PWM signal based on that; operate the converter in either buck or boost mode; and clamp the output of the error amplifier to control the frequency of the PWM signal.

As can be seen, after starting at block 1102, the inductor current $I_L$ 105 can be sensed at block 1104 and the method may proceed to block 1106.

At block 1106, the inductor $I_L$ 105 may be compared with an OC reference 513. This related to the comparator 506 in FIG. 5. The method may then proceed to block 1108.

At block 1108, it may be checked if $I_L$ 105 is greater than OC reference. If so, then the method may proceed to block 1110. If not, then the method may proceed to the beginning of block 1108.

At block 1110, an OC signal may be generated by latching a high output of the comparator when the $I_L$ exceeds the OC reference. The method may then proceed to block 1112.

At block 1112, the PWM signal that controls the switching of the transistors may be disabled via an off pulse for a predefined off time. The method may then proceed to block 1118 and simultaneously to 1114 and 1116.

At block 1118, it may checked if the off time is over. Is so, then the method may proceed to block 1120.

At block 1120, after checking that the off time is over, the latch may be reset. The method may then proceed to the beginning of block 1106 to compare the $I_L$ with OC reference.

Referring back to FIG. 5, an example of the above blocks 1104, 1106, 1108, 1110, 1118, and 1120 is shown in the current limit mode control circuit 500.

At block 1114, the converter may be operate in either a buck state or a boost state. This related to the buck-boost logic unit 702 shown in FIG. 7. An example of the all the previous blocks and additionally block 1114 is shown in the current limit mode control circuit 500.

At block 1116, the converter may clamp the output of the error amplifier to reduce overshoots in the regulated output voltage or current. This relates to the clamp circuit shown in FIG. 9. An example of the all the previous blocks and additionally block 1116 is shown in the current limit mode control circuit 900.

In the above specification, the terms "power converter" and "power supply" may be used interchangeably to mean the same thing. The terms "coupled to", "configured to", "operable to" may be used interchangeably to mean the same thing.

In the above specification, the terms "reference voltage control circuit" and "reference voltage modifier circuit" may be used interchangeably to mean the same thing. The terms "coupled to", "configured to", "operable to" may be used interchangeably to mean the same thing.

In the above specification, some common electronic circuits such as flip-flops or other digital circuits may be clocked by on-chip oscillators derived from phase locked loops (plls), crystal oscillators or any other conventional methods of generating a clock. In other embodiments, the clocks could be external as well.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A current limit mode control circuit for a power converter coupled to receive an input voltage and an input current, and coupled to provide an output voltage and an output current to a load comprising an inductor, and a plurality of transistors coupled to the inductor, wherein the circuit is configured to:
   compare an inductor current to a reference current;
   detect a safe current condition when the inductor current is equal to or lower than the reference current;
   detect an overcurrent (OC) condition when the inductor current is greater than the reference current;

generate, at a noninverting output of a latch, an inactive OC signal upon detecting the safe current condition;

generate, at an inverting output of the latch, an inverted OC signal based on the inactive OC signal, upon detecting the safe current condition;

generate, by a logic gate, an enabled PWM to driver signal based on a PWM control signal and the inverted OC signal based on the inactive OC signal, upon detecting the safe current condition;

generate, at the noninverting output of the latch, an active OC signal upon detecting the OC condition;

generate, at the inverting output of the latch, an inverted OC signal based on the active OC signal, upon detecting the OC condition;

generate, by the logic gate, a disabled PWM to driver signal based on the PWM control signal and the inverted OC signal based on the active OC signal, upon detecting the OC condition; and generate an off pulse to disable a PWM signal that is coupled to turn on or turn off one or more of the plurality of transistors for a predefined time upon detecting the OC condition.

2. The circuit according to claim 1, wherein the converter is configured to operate in a boost mode if the output voltage is higher than the input voltage, a buck mode when the output voltage is lower than the input voltage, or a buck-boost mode when the output voltage is substantially equal to the input voltage, and wherein the converter is configured to operate in the buck mode or the boost mode in response to the active OC signal.

3. The circuit according to claim 1, wherein the PWM signal is controlled by an error signal generated by an error amplifier, wherein the error signal has a first value proportional to a difference between a reference voltage and an output feedback voltage based on the active OC signal, and wherein the error signal has a second value lower than the first value based on the active OC signal.

4. The circuit according to claim 3, comprising:

a PWM generator configured to generate the PWM control signal;

a first SR latch coupled to latch the PWM control signal;

a comparator coupled to generate the active OC signal or the inactive OC signal;

a second SR latch coupled to latch a high or a low output of the comparator;

an AND gate coupled to receive the PWM control signal via the first latch and the inverted OC signal via the second latch;

a timer coupled to receive an output of the AND gate and coupled to the reset the second latch after the predefined time;

a buck-boost logic unit coupled to receive the PWM control signal via the AND gate and at least one of the active OC signal and the inactive OC signal; and a clamp circuit coupled to receive at least one of the active OC signal and the inactive OC signal and the output of the error amplifier, wherein the comparator is configured to generate the active OC signal via the second latch when the inductor current is greater than the reference current, wherein the comparator is configured to generate the inactive OC signal via the second latch when the inductor current is equal to or lower than the reference current, wherein at least one of the active OC signal and the inactive OC signal is coupled to enable the PWM control signal by enabling the AND gate, and wherein at least one of the active OC signal and the inactive OC signal is coupled to disable the PWM control signal by disabling the AND gate for the predefined time.

5. The circuit according to claim 4, wherein, the clamp circuit is configured to modify the value of the error signal from the first value to the second value based on the active OC signal.

6. A method for a current limit mode control circuit for a power converter coupled to receive an input voltage and an input current, and coupled to provide an output voltage and an output current to a load comprising an inductor, and a plurality of transistors coupled to the inductor, the method comprising:

comparing an inductor current to a reference current;

detecting a safe current condition when the inductor current is equal to or lower than the reference current;

detecting an overcurrent (OC) condition when the inductor current is greater than the reference current;

generating, at a noninverting output of a latch, an inactive OC signal upon detecting the safe current condition;

generating, at an inverting output of the latch, an inverted OC signal based on the inactive OC signal, upon detecting the safe current condition;

generating, by a logic gate, an enabled PWM to driver signal based on a PWM control signal and the inverted OC signal based on the inactive OC signal, upon detecting the safe current condition;

generating, at the noninverting output of the latch, an active OC signal upon detecting the OC condition;

generating, at the inverting output of the latch, an inverted OC signal based on the active OC signal, upon detecting the OC condition;

generating, by the logic gate, a disabled PWM to driver signal based on the PWM control signal and the inverted OC signal based on the active OC signal, upon detecting the OC condition; and generating an off pulse to disable a PWM signal that is coupled to turn on or turn off one or more of the plurality of transistors for a predefined time upon detecting the OC condition.

7. The method according to claim 6, further comprising:

operating the converter in a buck mode, a boost mode or a buck-boost mode in response to the active OC signal; and operating the converter in either the buck mode or the boost mode in response to the inactive OC signal.

8. The method of claim 7, wherein the converter is configured to operate in the boost mode if the output voltage is higher than the input voltage, the buck mode when the output voltage is lower than the input voltage, and the buck-boost mode when the output voltage is substantially equal to the input voltage.

9. The method according to claim 6, further comprising:

controlling the PWM signal by an error signal generated by an error amplifier;

wherein the error signal has a first value proportional to a difference between a reference voltage and an output feedback voltage based on the inactive OC signal, and wherein the error signal has a second value lower than the first value based on the active OC signal.

10. The method according to claim 9, further comprising:

generating the PWM control signal by a PWM generator;

latching the PWM control signal by a first SR latch;

generating the active OC signal or the inactive OC signal by a comparator, latching a high or a low output of the comparator by a second SR latch, the latch comprising the second SR latch;

providing the PWM control signal via the first latch and the inverted OC signal via the second latch to an AND gate, the logic gate comprising the AND gate;

providing an output of the AND gate to a timer and resetting the second latch by the time after the predefined time;

providing the PWM control signal via the AND gate and at least one of the active OC signal and the inactive OC signal to a buck-boost logic unit;

receiving at least one of the active OC signal and the inactive OC signal and the output of the error amplifier by a clamp circuit;

generating the active OC signal by the comparator via the second latch when the inductor current is greater than the reference current;

generating the inactive OC signal by the comparator via the second latch when the inductor current is equal to or lower than the reference current;

enabling the AND using the active OC signal to enable the PWM control signal; and disabling the AND gate using inactive at least one of the active OC signal and the inactive OC signal to disable the PWM control signal for the predefined time.

11. The method according to claim 10, further comprising:

modifying by the clamp circuit, a value of the error signal from the first value to the second value based on the active OC signal.

12. A current limit mode control circuit for a power converter coupled to receive an input voltage and an input current, and coupled to provide an output voltage and an output current to a load comprising an inductor and a plurality of transistors coupled to the inductor, the circuit comprising:

a PWM generator configured to generate a PWM control signal;

a first SR latch coupled to latch the PWM control signal;

a comparator coupled to generate an active or inactive overcurrent (OC) signal;

a second SR latch coupled to latch a high or a low output of the comparator, an AND gate coupled to receive the PWM control signal via the first latch and an inverted OC signal via the second latch;

a timer coupled to receive an output of the AND gate and coupled to the reset the second latch after the predefined time;

a buck-boost logic unit coupled to receive the PWM control signal via the AND gate and the OC signal; and a clamp circuit coupled to receive the OC signal and the output of the error amplifier.

13. The circuit according to claim 12, wherein the comparator is configured to:

generate an active OC signal via the second latch when an inductor current is greater than a reference current; and generate an inactive OC signal via the second latch when the inductor current is equal to or lower than the reference current.

14. The circuit according to claim 12, wherein the comparator is configured to:

enable the PWM control signal by enabling the AND gate with the OC signal; and disable the PWM control signal by disabling the AND gate for the predefined time with the OC signal.

15. The circuit according to claim 12, wherein the circuit is configured to:

compare an inductor current to a reference current;

detect a safe current condition when the inductor current is equal to or lower than the reference current;

detect an OC condition when the inductor current is greater than the reference current;

generate an inactive OC signal upon detecting the safe current condition;

generate an active OC signal upon detecting the OC condition; and generate an off pulse to disable a PWM signal that is coupled to turn on or turn off one or more of the plurality of transistors for a predefined time upon detecting the OC condition.

16. The circuit according to claim 12, wherein the converter is configured to operate in a boost mode if the output voltage is higher than the input voltage and in response to the OC signal being active, a buck mode when the output voltage is lower than the input voltage and in response to the OC signal being active, or a buck-boost mode when the output voltage is substantially equal to the input voltage.

17. The circuit according to claim 12, wherein the PWM signal is controlled by an error signal generated by an error amplifier, wherein the error signal has a first value proportional to a difference between a reference voltage and an output feedback voltage when the OC signal is inactive, and wherein the error signal has a second value lower than the first value when the OC signal is active.

* * * * *